(12) United States Patent
Buschbeck et al.

(10) Patent No.: US 7,948,206 B2
(45) Date of Patent: May 24, 2011

(54) ASSEMBLY COMPRISING A THREE-PHASE MACHINE AND A FREQUENCY CONVERTER

(75) Inventors: Frank Buschbeck, Vienna (AT); Martin Groeschl, Vienna (AT); Gerwin Preisinger, Steyr (AT); Andreas Jagenbrein, Leithaprodersdorf (AT)

(73) Assignee: AB SKF, Gothenburg (SE)

( * ) Notice: Subject to any disclaimer, the term of this patent is extended or adjusted under 35 U.S.C. 154(b) by 761 days.

(21) Appl. No.: 11/918,450

(22) PCT Filed: Apr. 5, 2006

(86) PCT No.: PCT/EP2006/003066
§ 371 (c)(1),
(2), (4) Date: Jan. 24, 2008

(87) PCT Pub. No.: WO2006/108535
PCT Pub. Date: Oct. 19, 2006

(65) Prior Publication Data
US 2009/0039816 A1    Feb. 12, 2009

(30) Foreign Application Priority Data

Apr. 13, 2005 (DE) .................. 10 2005 016 962

(51) Int. Cl.
*H02K 11/00* (2006.01)
*H02M 1/12* (2006.01)
*H02P 27/04* (2006.01)
(52) U.S. Cl. ......... 318/811; 318/812; 318/710; 318/727
(58) Field of Classification Search .................. 318/430, 318/434, 710, 727, 811, 812; 361/34, 47, 361/93.1; 327/551, 552
See application file for complete search history.

(56) References Cited

U.S. PATENT DOCUMENTS 3,699,335 A * 10/1972 Giaimo, Jr. ................... 250/326
5,852,558 A    12/1998 Julian et al.
6,633,092 B2 * 10/2003 Dahler et al. ................ 307/100
(Continued)

FOREIGN PATENT DOCUMENTS

DE        103 10 577 A1    9/2004
(Continued)

OTHER PUBLICATIONS

International Search Report for PCT/EP2006/003066 dated Aug. 8, 2006.

(Continued)

*Primary Examiner* — Paul Ip
(74) *Attorney, Agent, or Firm* — Buchanan, Ingersoll & Rooney PC

(57) ABSTRACT

Disclosed is an assembly encompassing a three-phase machine and a frequency converter. Said assembly has the following characteristics: the three-phase machine comprises a stator and a rotor; at least the three circuits of the stator and/or the rotor can be operated in an insulated manner relative to each other for the three phases of the rotary current while being connectable to one separate terminal point of the frequency converter, respectively, so as to be insulated relative to each other; and the frequency converter is embodied with a D.C. link having a grounded neutral in such a way that a voltage or current which is symmetric regarding the potential to ground can be output at any moment between the two associated terminal points of each circuit.

15 Claims, 2 Drawing Sheets

U.S. PATENT DOCUMENTS

Figure 1:
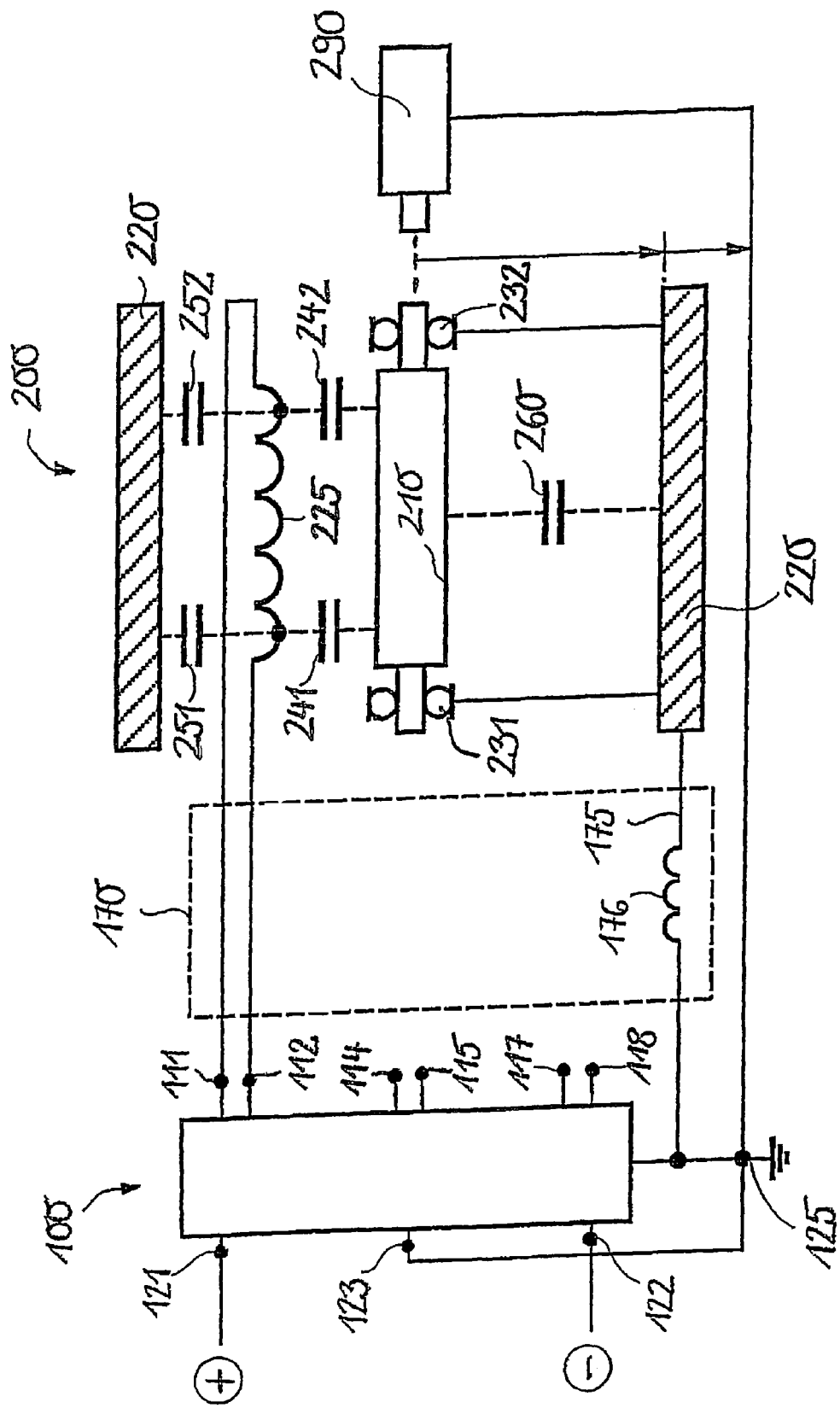

| | | | | |
|---|---|---|---|---|
| 6,636,107 B2 * | 10/2003 | Pelly | | 327/552 |
| 7,187,229 B2 * | 3/2007 | Pelly | | 327/551 |
| 7,385,438 B2 * | 6/2008 | Pelly | | 327/551 |
| 7,583,136 B2 * | 9/2009 | Pelly | | 327/551 |
| 7,606,052 B2 * | 10/2009 | Akagi | | 363/40 |
| 2001/0045863 A1 * | 11/2001 | Pelly | | 327/552 |
| 2002/0012215 A1 * | 1/2002 | Dahler et al. | | 361/93.1 |
| 2003/0197989 A1 * | 10/2003 | Nojima | | 361/47 |
| 2004/0004514 A1 * | 1/2004 | Pelly | | 327/552 |
| 2004/0120166 A1 | 6/2004 | Bijlenga | | |
| 2004/0207463 A1 * | 10/2004 | Pelly | | 327/552 |
| 2007/0120607 A1 * | 5/2007 | Pelly | | 330/302 |
| 2008/0093850 A1 * | 4/2008 | Taneja et al. | | 290/36 R |
| 2008/0180164 A1 * | 7/2008 | Pelly | | 327/552 |
| 2009/0008945 A1 * | 1/2009 | Helle et al. | | 290/55 |
| 2009/0015112 A1 * | 1/2009 | Binder et al. | | 310/68 R |
| 2009/0109713 A1 * | 4/2009 | Schnetzka et al. | | 363/34 |

FOREIGN PATENT DOCUMENTS

EP    1 083 654 A2    3/2001

OTHER PUBLICATIONS

International Preliminary Report on Patentability (PCT/ IB/338 and PCT/IB/373) and accompanying Written Opinion (PCT/ISA/237) issued in PCT/EP2006/003066, mailed Nov. 8, 2007.

* cited by examiner

ASSEMBLY COMPRISING A THREE-PHASE MACHINE AND A FREQUENCY CONVERTER

The invention relates to an arrangement with a three-phase a.c. machine and a frequency converter.

A known arrangement with a three-phase a.c. motor and a frequency converter appears, for example, as follows: The three-phase a.c. motor comprises a rotor and a stator, whereby the rotor is mounted in a rotatable manner via a bearing opposite the stator. In this case, outer rings of the bearing are electrically conductive with a motor housing of the three-phase a.c. machine, whereby the motor housing in turn is connected via a protective ground connection to a grounding point, with which the frequency converter is also connected. In addition, the rotor of the three-phase a.c. motor can be connected to a shaft of a working machine that is driven by a three-phase a.c. motor, whereby this connection can be designed in an electrically conductive or insulated manner.

In this case, the stator of the three-phase a.c. motor comprises at least three stator windings, of which in each case one end is interconnected at a neutral point. The respective other ends of the stator windings are connected via corresponding motor terminals to corresponding output terminals of the frequency converter. The connection between frequency converter and three-phase a.c. motor is carried out by, for example, a three-core motor connecting cable.

Depending on the switching program of the frequency converter, at specific times at least one positive or one negative voltage of identical magnitude, in terms of value, relative to a ground potential, is present at the three output terminals of the frequency converter. Based on the switching program, a pulsed voltage curve with steep pulse edges is thus produced on the output terminals of the frequency converter. One third of the sum of said voltages at the output terminals of the frequency converter is referred to, in this case, as common mode voltage.

Each of the three stator windings has a virtually unavoidable parasitic stator-rotor stray capacitance in the direction of the rotor. Via this stator-rotor stray capacitance, the abrupt changes in the electric voltages go from the motor terminals to the rotor and thus also to the inner rings of the bearing whose outer rings are connected in an electrically conducting manner to the ground motor housing, as already described. Usually, in this case, the value of the stator-rotor stray capacitance is approximately one to two orders of magnitude smaller than a rotor-housing stray capacitance between the rotor and the motor housing, by which a great attenuation of the voltage jumps in the direction toward the bearing is produced, but nevertheless, via the bearing, voltages can reach values at which a lubricating film is broken down electrically in the bearing and damage to the bearing results. Since each of the stator-rotor stray capacitances here forms a capacitive voltage divider in each case with the rotor-housing stray capacitance, the time voltage curve on the rotor is similar to that of the common mode voltage.

In addition, on the three-phase a.c. motor between the individual stator windings and the motor housing, there are stator-housing stray capacitances, whereby each stator winding produces the following parasitic electric circuit: starting from a voltage supply of the frequency converter, relative to the grounding point, to one of the output terminals of the frequency converters, via the motor connecting cable to the respective stator winding, via its stator-housing stray capacitance to the motor housing and then via the protective ground connection back to the grounding point. The intensity of current in this electric circuit is determined essentially by the edge steepness of the voltages at the output terminals of the frequency converter. In this case, the current pulses are needle-shaped. The current here flows essentially during the switching processes and optionally causes a considerable drop in voltage of, for example, up to 100 volts in a virtually unavoidable inductivity of protective ground connection. Via the rotor-housing stray capacitance between rotor and motor housing, these voltage pulses also go to the rotor and produce, if the working machine is connected via a separate protective ground connection to the grounding point, a potential difference relative to the working machine. In this case, a danger of destruction exists both for the bearing of the three-phase a.c. motor and for that of the working machine. Another danger exists in this case also for individuals when simultaneously in contact with the motor housing and the housing of the working machine.

To avoid the above-mentioned damage to the bearing, it is known, for example, to equip an outer jacket of an outer ring of a bearing, designed, for example, as a roller bearing, or an inner jacket of an inner ring of the bearing with a ceramic insulation layer. Such insulated bearings offer good protection against bearing damage based on low-frequency parasitic currents, as they can be induced, for example, because of magnetic imbalances of the motor in the motor shaft; because of the high capacity of such bearings, their insulation action compared to the above-described high-frequency parasitic currents, however, frequently is not adequate. Another possibility for avoiding the above-mentioned bearing damage consists in using roller bearings that are made of ceramic, which is associated with a significant manufacturing expense and thus has a negative effect with respect to the costs of such roller bearings.

One object of the invention is to provide an improved arrangement with a three-phase a.c. machine and a frequency converter, such that in particular bearings of the three-phase a.c. machine or a coupled working machine are protected in a simple fashion against damage and destruction because current is flowing.

The object is achieved by the subject of claim 1. Advantageous embodiments are described in the subclaims.

According to claim 1, an arrangement with a three-phase a.c. machine and a frequency converter contains the following features:

The three-phase a.c. machine comprises a stator and a rotor, whereby at least the three electric circuits of the stator and/or the rotor for the three three-phase a.c. phases can be operated insulated from one another and can be connected insulated from one another with one separate connecting point each of the frequency converter, and The frequency converter is designed with a midpoint-grounded d.c. intermediate circuit, in such a way that for each electric circuit, an electric voltage or current that is symmetrical relative to the ground potential can be output between the two corresponding connecting points.

In this case, the invention is based on a finding that parasitic voltages that are coupled from opposite poles to a shaft of the three-phase a.c. machine cancel out one another, so that when, for example, the stator windings of the three-phase a.c. machine operate insulated from one another in connection with exclusively balanced-to-ground voltages being present at the individual stator windings, the above-described drawbacks with respect to bearing damage and contact voltages are obviated, which applies both with use of bearings between rotor and stator that are insulated against flowing current, and in bearings that are free of such insulation. Relative to the above-described arrangement, it is necessary for the arrangement according to the invention that the three-phase a.c. machine be accessible to an operation in open triangular arrangement, that the frequency converter has at least six output terminals to dispense the balanced-to-ground voltages, and that the three-phase a.c. machine and the frequency converter are connected to an at least six-core machine connecting cable. The arrangement according to the invention advantageously has the result that the parts of the arrangement listed below constantly remain at ground potential: the rotor of the three-phase a.c. machine as well as the bearing inner rings connected with it as well as an optionally present coupling to the shaft of another machine that is connected to the three-phase a.c. machine, for example a working machine; the machine housing as well as the bearing outer rings that are connected to the machine housing, and finally the protective ground connection on its entire length between the three-phase a.c. machine and the grounding point.

Accordingly, the following advantages of the arrangement according to the invention are to be emphasized: the edges of the voltage output to the output terminals of the frequency converter do not produce any flow of current through the protective ground connection of the three-phase a.c. machine. An onset of parasitic voltages that are present via the bearing is prevented because of the stray capacitances. Also, parasitic voltages on the stator of the three-phase a.c. machine against ground and/or other support parts, for example a working machine that is operated by the three-phase a.c. machine, are prevented. As a result, the wiring in particular for outgoing and return conduction between the three-phase a.c. machine and the frequency converter can be made compact; a low high-frequency radiation is advantageously achieved. In addition, in the case of a multiple grounding, only a slight increase in the high-frequency radiation is produced. Finally, the machine connecting cable can be made, optionally even unshielded. In this case, the unit is therefore insulated for workers. Also, for the entire arrangement according to the invention, thoroughly tested assemblies can advantageously be used, in particular with respect to susceptibility to error.

For a perfect functioning of the arrangement according to the invention, the requirement is only that the stray capacitances of each of the stator windings relative to the machine housing or relative to the rotor with respect to a center of the stator winding be essentially symmetrically divided between their two connecting points. This is generally, however, an inherently existing property of many three-phase a.c. machines. Slighter deviations from this capacitive symmetry of each individual stator winding relative to the rotor or the machine housing or imbalances in the ground-symmetric output voltages of the frequency converter result only in the onset of small parasitic residual currents and reduce the effectiveness of the arrangement according to the invention only slightly.

Figure 2:
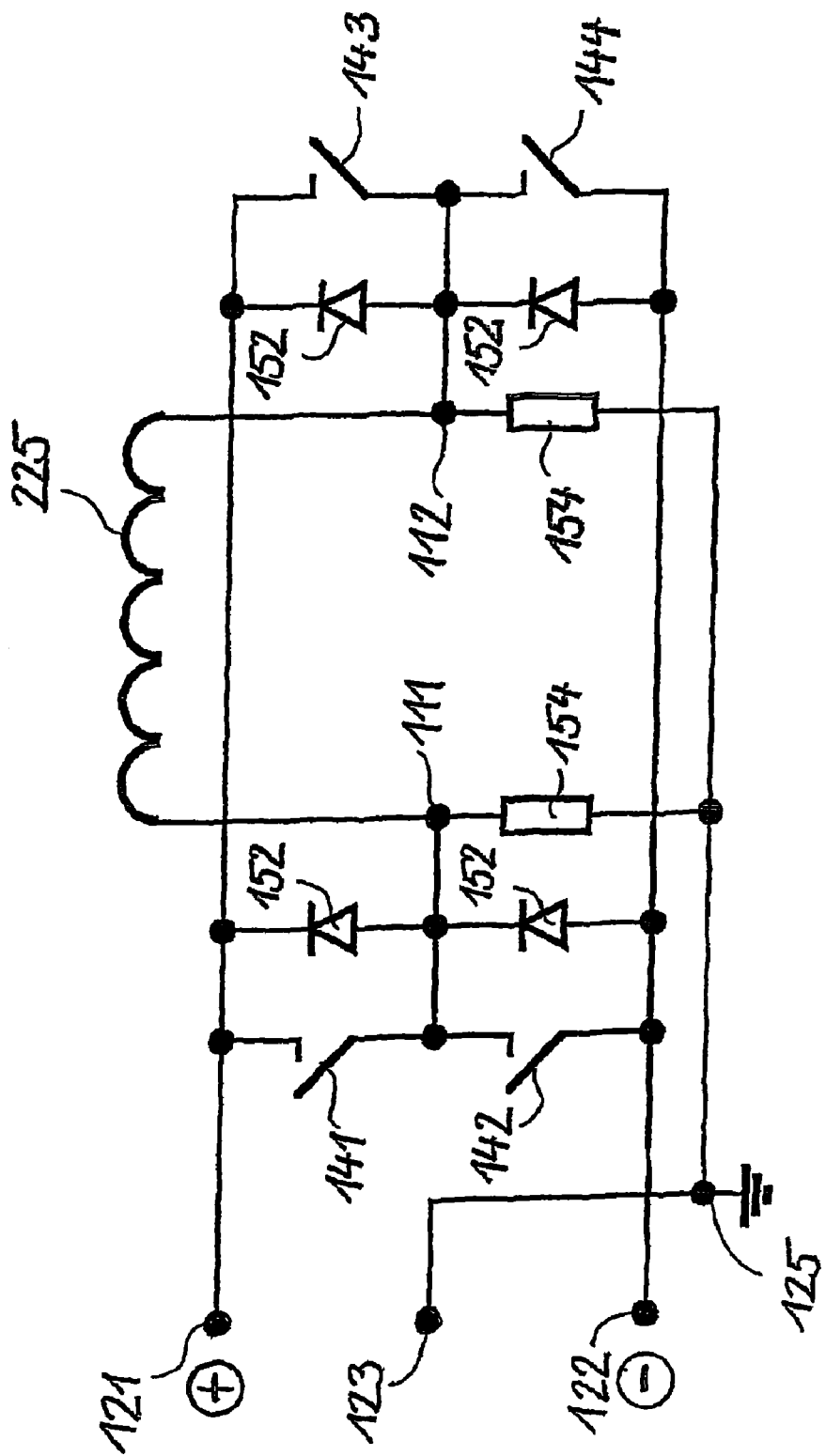

Other advantages, features and details of the invention follow from the embodiment of the invention, described below, based on the figures. Here:

FIG. 1 shows a circuit diagram of an arrangement with a frequency converter and a three-phase a.c. motor, and FIG. 2 shows a circuit diagram of a pole-changer circuit of the frequency converter.

As an embodiment of the invention, FIG. 1 shows a circuit diagram of an arrangement with a frequency converter 100 and a three-phase a.c. motor 200. In this case, the three-phase a.c. motor 200 comprises a rotor 210 and a stator, whereby the rotor 210 is mounted to rotate relative to the stator over at least two roller bearings 231 and 232, which can be designed free of insulation against electric current flow. In this case, the outer rings of the roller bearings 231 and 232 can be connected in an electrically conductive manner to a motor housing 220 of the three-phase a.c. motor 200, whereby the motor housing 220 in turn is connected via a protective ground connection 175 to a grounding point 125, to which the frequency converter 100 is also connected. In addition, the rotor 210 of the three-phase a.c. motor 200 is coupled to a shaft of a working machine 290 that is driven by a three-phase a.c. motor 200.

In this case, the stator of the three-phase a.c. motor 200 comprises at least three stator windings, whereby for the sake of clarity, only one of the stator windings 225 is shown. For each stator winding, in each case their two ends are connected to corresponding output terminals 111, 112, or 114, 115, or 117 and 118 of the frequency converter 100. The connection between the frequency converter 100 and the three-phase a.c. motor 200 is carried out via an at least six-core motor connecting cable 170 that optionally is designed unshielded and that comprises another core for the protective ground connection 175 in the embodiment that is shown. In this case, the description below for the stator winding 225 that is connected to the output terminals 111 and 112 of the frequency converter 100 correspondingly applies to the other stator windings, not shown in FIG. 1, that are connected to the output terminals 114 and 115, as well as 117 and 118.

In this case, the three-phase a.c. motor 200 is designed such that between the stator winding 225 and the rotor 210, a stator-rotor stray capacitance 241 and 242 is essentially distributed symmetrically between the two connecting points of the stator winding 225 relative to the midpoint thereof. The equivalent applies for a stator-housing stray capacitance 251 and 252 between the stator winding 225 and the motor housing 220. In this case, above-mentioned symmetries of stray capacitances 241 and 242 as well as 251 and 252 are present as inherent properties in the case of many three-phase a.c. motors.

Depending on the switching program of the frequency converter 100, in this case, either a ground-symmetric voltage of a size that can be specified in advance or a voltage that is equal to zero adjoins the two connecting points of the stator winding 225. To produce the above-mentioned balanced-to-ground voltage, the frequency converter 100 for the stator winding 225 comprises, for example, a so-called pole-changer circuit that is to be explained in still more detail based on FIG. 2. To this end, a positive d.c. voltage of a size that can be specified in advance is to be provided on an output terminal 121 in the frequency converter 100, and an equally large negative d.c. voltage in terms of value is to be provided at an input terminal 122. For said balanced-to-ground voltages, in this case the input terminal 123 is connected to the grounding point 125 as a midpoint on the d.c. voltage side of the frequency converter 100.

The interaction of the above-mentioned symmetry of the stray capacitances 241 and 242 as well as 251 and 252 and the balanced-to-ground voltage can be conceived of as follows: based on the symmetry of the stator-rotor stray capacitance 241 and 242, the latter can be conceived of as two capacitances 241 and 242 of identical magnitude, whereby one is assigned to one of the two connecting points of the stator winding 225 and the other is assigned to the other connecting point of the stator winding 225. Based on the balanced-to-ground voltage, voltages of identical magnitude in terms of value but with opposite signs adjoin the two capacitances 241 and 242, such that voltage jumps that are coupled to the rotor 210 are cancelled because of their different signs. The electric potential of the rotor 210 therefore permanently corresponds to the center potential of the trigger pulses, which the requirements dictate be identical to the ground potential. In this case, owing to the large conductive surface of the rotor 210 and the resulting low electric impedance, the entire rotor 210 or the motor shaft is at a spatially constant potential. For the stator-housing stray capacitance 251 and 252, which can also be conceived of as two capacitances 251 and 252 of the same size, the preceding description correspondingly applies to the stator-rotor stray capacitance 241 and 242, such that the motor housing 220 is also permanently at ground potential. This now means that no electric voltage occurs via the roller bearings 231 and 232. Bearing damage and bearing destruction because of current passing through them due to voltages being capacitively coupled to the rotor are thus prevented.

Since the total current is equal to zero because of the stator-housing stray capacitance 251 and 252, the resulting current to the motor housing 220 is also equal to zero, such that also no current flows via a rotor-housing stray capacitance 260. Thus, the protective ground connection 175 of the three-phase a.c. motor 200 advantageously also does not result in any current, such that no voltage drops even because of their inductivity 176.

A balanced-to-ground voltage between the output terminals 111 and 112 as well as 114 and 115 as well as 117 and 118 of the frequency converter in this case can be produced with the known so-called pole-changer circuit sketched in FIG. 2. In this case, a d.c. voltage supply at the pole-changer circuit is carried out symmetrically to the ground potential via the two input terminals 121 (positive voltage) and 122 (negative voltage). Between the two output terminals 111 and 112 of the frequency converter 100, the stator winding 225 is connected. For a flow of current, starting from the output terminal 111 via the stator winding 225 to the output terminal 112, the semiconductor switches 141 and 144 are to be closed, while the other semiconductor switches 142 and 143 must be opened. For a reversed direction of flow, the semiconductor switches 142 and 143 are closed and for this purpose, the semiconductor switches 141 and 144 are opened. The semiconductor switches 141, 142, 143 and 144 are in this case designed, for example, as transistors, IGBTs or GTOs. The diodes 152 of the pole-changer circuit are used in a way that is known in the art in the protection of the semiconductor switches 141, 142, 143 and 144 against overloads in the moment of their opening. The resistors 154 of the pole-changer circuit in this case bring about the degradation of residual charges in the motor connecting cable 170 and in the stray capacitances 241, 242, 251 and 252 during a switching status in which all semiconductor switches 141, 142, 143 and 144 are open. To produce corresponding voltage between the output terminals 114 and 115 as well as between 117 and 118, corresponding pole-changer circuits are provided as previously described in the frequency converter 100.

The present invention has been described by way of exemplary embodiments, to which it is not limited. For example, the bearings can be any one of roller bearings, roller steel bearings, cylinder rollers, cone rollers and/or spherical roller bearing and/or ball bearings. It can, but does not have to, be insulated against flowing current. The electric circuits can include a three-phase a.c. machine winding.

The frequency converter can be designed to tap-off the balanced-to-ground voltage or current between two d.c. voltage potentials of opposite polarity but equal value. The frequency converter can include one pole-converter circuit for each electric circuit.

The balanced-to-ground voltage or current can be modulated by pulse width.

LIST OF REFERENCE SYMBOLS

100 Frequency Converter
111, 112, 114, 115, 117, 118 Output Terminal
121, 122, 123 Input Terminal
125 Grounding Point
141, 142, 143, 144 Semiconductor Switch
152 Diode
154 Resistor
170 Motor Connecting Cable
175 Protective Ground Connection
76 Inductivity
200 Three-Phase a.c. Motor
210 Rotor
220 Motor Housing
225 Stator Winding
231, 232 Roller Bearing
241, 242 Stator-Roller Stray Capacitance
251, 252 Stator-Housing Stray Capacitance
260 Rotor-Housing Stray Capacitance
290 Working machine

The invention claimed is:

1. Arrangement with a three-phase a.c. machine and a frequency converter comprising:
the three-phase a.c. machine, including a stator and a rotor, whereby at least the three electric circuits of the stator and/or the rotor for the three three-phase a.c. phases are insulated from one another in operation with one separate connecting point of the stator and/or the rotor each corresponding to the connecting point of the frequency converter, and
the frequency converter being a midpoint-grounded d.c. intermediate circuit, in such a way that for each electric circuit, an electric voltage or current that is symmetrical relative to the ground potential can be output between the two corresponding connecting points.

2. Arrangement according to claim 1, whereby the rotor is mounted to rotate against the stator via at least one bearing.

3. Arrangement according to claim 2, whereby the bearing comprises a roller bearing.

4. Arrangement according to claim 3, whereby the roller bearing is made essentially of roller bearing steel.

5. Arrangement according to claim 3, whereby the roller bearing comprises a roller, in particular cylinder rollers, cone rollers and/or spherical roller bearings and/or ball bearings.

6. Arrangement according to claim 2, whereby the bearing is made as a bearing that is insulated against flowing current.

7. Arrangement according to claim 1, whereby each of the electric circuits comprises a three-phase a.c. machine winding.

8. Arrangement according to claim 1, whereby the frequency converter is designed to tap-off the balanced-to-ground voltage or current between two d.c. voltage potentials of opposite polarity but of equal value.

9. Arrangement according to claim 1, whereby the balanced-to-ground voltage or current is modulated by pulse width.

10. Arrangement according to claim 1, whereby the frequency converter comprises one pole-changer circuit for each electric circuit.

11. Arrangement according to claim 1, whereby the three-phase a.c. machine is designed such that for each electric circuit, a stray capacitance is divided essentially symmetrically relative to a housing of the three-phase a.c. machine relative to a midpoint of the electric circuit between the two connecting points of the electric circuit.

12. Arrangement according to claim 1, whereby the three-phase a.c. machine is designed such that for each electric circuit, a stray capacitance relative to a shaft of the three-phase a.c. machine is divided essentially symmetrically between the two connecting points of the electric circuit relative to a midpoint of the electric circuit.

13. Arrangement according to claim 1, whereby the three-phase a.c. machine can be connected to the frequency converter via an at least six-core connecting line.

14. Arrangement according to claim 13, whereby the connecting line comprises at least a seventh core as a protective ground connection to connect a housing of the three-phase a.c. machine to a grounding point on the frequency converter.

15. Arrangement according to claim 13, whereby the connecting line is unshielded.

* * * * *